United States Patent
Hilger et al.

(12)

(10) Patent No.: US 7,001,931 B2
(45) Date of Patent: Feb. 21, 2006

(54) BLENDS OF CRYSTALLINE AND AMORPHOUS COMPOUNDS WHICH CAN BE ACTIVATED BY ACTINIC RADIATION, METHOD FOR THE PRODUCTION AND USE THEREOF

(75) Inventors: Christopher Hilger, Münster (DE); Rainer Blum, Ludwighshafen (DE)

(73) Assignee: BASF Coatings AG, Munster (DE)

( * ) Notice: Subject to any disclaimer, the term of this patent is extended or adjusted under 35 U.S.C. 154(b) by 9 days.

(21) Appl. No.: 10/432,177

(22) PCT Filed: Dec. 18, 2001

(86) PCT No.: PCT/EP01/14913

§ 371 (c)(1),
(2), (4) Date: May 20, 2003

(87) PCT Pub. No.: WO02/50147

PCT Pub. Date: Jun. 27, 2002

(65) Prior Publication Data

US 2004/0077742 A1    Apr. 22, 2004

(30) Foreign Application Priority Data

Dec. 18, 2000  (DE)  ................................ 100 63 159

(51) Int. Cl.
*C08G 18/30* (2006.01)
*C08G 18/67* (2006.01)
*C08G 85/00* (2006.01)
*C08G 63/78* (2006.01)

(52) U.S. Cl. .................... 522/178; 525/444; 525/447; 525/453; 525/454; 525/458; 525/440; 522/109; 522/181; 522/182; 522/111

(58) Field of Classification Search ................ 522/178, 522/181, 182

See application file for complete search history.

(56) References Cited

U.S. PATENT DOCUMENTS

| | | | | |
|---|---|---|---|---|
| 3,974,303 | A | 8/1976 | Iwase et al. ................... 427/27 |
| 5,068,305 | A | 11/1991 | Meixner et al. ............... 528/49 |
| 5,620,751 | A | 4/1997 | Brindoepke et al. ......... 427/506 |
| 5,652,053 | A * | 7/1997 | Liegeois ..................... 442/150 |
| 6,011,080 | A * | 1/2000 | Daly et al. ................... 522/107 |
| 6,017,593 | A * | 1/2000 | Daly et al. ................... 427/559 |
| 6,017,640 | A * | 1/2000 | Muthiah et al. ............. 428/514 |
| 6,028,212 | A * | 2/2000 | Shah et al. .................. 560/115 |
| 6,380,279 | B1 * | 4/2002 | Moens et al. ................ 522/111 |
| 6,747,070 | B1 * | 6/2004 | Wenning et al. ............... 522/90 |
| 6,825,241 | B1 * | 11/2004 | Blum et al. .................... 522/96 |
| 6,830,860 | B1 * | 12/2004 | Sacripante et al. ....... 430/109.3 |

FOREIGN PATENT DOCUMENTS

| | | |
|---|---|---|
| CA | 2157657 | 9/1995 |
| EP | 585 742 | 8/1993 |
| EP | 636 669 | 7/1994 |
| WO | WO95/35332 | 6/1995 |
| WO | WO99/14254 | 3/1999 |

* cited by examiner

*Primary Examiner*—Susan Berman

(57) ABSTRACT

A blend activatable with actinic radiation and solid at room temperature, comprising (A) at least one crystalline compound containing on average per molecule at least one reactive functional group having at least one bond which can be activated with actinic radiation, and (B) at least one amorphous compound containing on average per molecule at least one reactive functional group having at least one bond which can be activated with actinic radiation; process for its preparation, and its use.

2 Claims, No Drawings

BLENDS OF CRYSTALLINE AND AMORPHOUS COMPOUNDS WHICH CAN BE ACTIVATED BY ACTINIC RADIATION, METHOD FOR THE PRODUCTION AND USE THEREOF

CROSS REFERENCE TO RELATED APPLICATIONS

This application is a National Phase Application of patent application Ser. No. PCT/EP01/14913 filed on 18 Dec. 2001, which claims priority to DE 100 63 159.2, filed on 18 Dec. 2000.

The present invention relates to novel blends of crystalline and amorphous compounds which can be activated with actinic radiation. The present invention further relates to a novel process for preparing blends of crystalline and amorphous compounds which can be activated with actinic radiation. The present invention additionally relates to the use of the novel blends of crystalline and amorphous compounds which can be activated with actinic radiation, or of such blends prepared by the novel process, to prepare coating materials, adhesives, and sealing compounds.

Here and below, actinic radiation means electromagnetic radiation such as X-rays, UV radiation, visible light or near IR (NIR) light, especially UV radiation, or corpuscular radiation such as electron beams.

The coating, bonding or sealing of primed or unprimed substrates with solid pulverulent coating materials, adhesives or sealing compounds which can be cured with actinic radiation is increasingly gaining interest. The reasons for this are anticipated advantages in surface smoothness and the reduced thermal load on the substrates, these advantages resulting from the separation of melting process and curing reaction as compared with coating materials, adhesives and sealing compounds curable by means of heat alone.

In practice, however, a number of problems occur, caused by the irreconcilability of the blocking resistance of the powders (cf. Römpp Lexikon Lacke und Druckfarben ["Römpp 1"], Georg Thieme Verlag, Stuttgart, N.Y., 1998, "Blocking resistance", page 81) and the elasticity of the cured coatings, adhesive films, and seals. If the polymers are made so hard that blocking-resistant powders are obtained, the coatings, adhesive films and seals produced from them are brittle and adhere poorly to the substrates. Elasticity in the coatings, adhesive films and seals, on the one hand, and blocking resistance in the powders, on the other hand, can be achieved using polymers of sufficiently high molecular weight. In that case, however, the melts become so highly viscous that they no longer flow out well.

These problems also affect low molecular mass, oligomeric and polymeric urethanes which can be cured with actinic radiation.

In the context of the present invention, low molecular mass and oligomeric compounds are resins containing at least 2 to 15 monomer units in their molecule. Polymers in the context of the present invention are resins containing at least 10 monomer units in their molecule. For further details of these terms, reference is made to Römpp 1, "Oligomers", page 425.

Polyurethanes of this kind are known, for example, from the German patent application DE 24 36 186 A1 or the U.S. patent U.S. Pat. No. 3,974,303 A. Described therein are pulverulent and thermoplastic polymers containing from 0.5 to 3.5 polymerizable unsaturated double bonds per 1000 molar weight, and their use as radiation-curable binders. Specifically, a (meth)acrylate-functionalized polyurethane is described which is prepared in the melt from tolylene diisocyanate, 2-hydroxyethyl methacrylate and trimethylolpropane in a molar ratio of 3:3:1. The (meth)acrylate-functionalized polyurethane has a melting point of about 65° C. and a polymerizable double bond content of 2.9 double bonds per 1000 molecular weight. However, no details are given regarding the stability of the melt. The polyurethane may be used per se as a powder coating which is curable with actinic radiation.

The European patent application EP 0 636 669 A1 describes mixtures of unsaturated polyesters or (meth)acrylate-functionalized polyacrylates, the polyacrylates being obtained in a conventional addition polymerization, and, as crosslinking agents, polyurethanes functionalized with vinyl ethers or (meth)acrylic esters. The examples disclose only mixtures of polyesters and vinyl ether urethanes. The vinyl ether urethanes are prepared in chloroform as solvent.

The European patent application EP 0 410 242 A1 discloses polyurethanes which contain (meth)acryloyl groups in an amount corresponding to from 3 to 10% by weight, based on the polyurethane, of =C=C= (molecular weight 24). These known polyurethanes have melting points or melting ranges, not specified in any more detail, in the temperature range from 50 to 180° C. They are prepared using isophorone diisocyanate, 4,4'-diisocyanatodicyclohexylmethane, 4,4,'-diisocyanatodiphenylmethane, its technical-grade mixtures with 2,4'-diisocyanatodiphenylmethane and, if desired, the higher homologs of these diisocyanates, 2,4'-diisocyanatotoluene and its technical-grade mixtures with 2,6'-diisocyanatotoluene (tolylene diisocyanate), and also biuret-, isocyanurate- or urethane-modified polyisocyanates based on these simple polyisocyanates. On the basis of these polyisocyanates it is difficult to prepare polyurethanes having a particularly narrow melting range, let alone a defined melting point. In particular, the use of polyisocyanates having an average functionality >2 leads to polyurethanes with an undesirably broad molecular weight distribution, thereby limiting their usefulness in radiation-curable powder coating materials. Some of the polyurethanes specified in the examples, it is true, begin to soften at practicable temperatures of 85–95° C.; however, because of their high degree of branching, the melt viscosity at these temperatures is too high for them to be used in radiation-curable powder coating materials. Additionally, the polyurethanes are prepared in ethyl acetate as solvent, after which the solvent must be evaporated under reduced pressure at low temperatures.

The European patent EP 0 783 534 A1 discloses (meth) acrylate-functionalized polyurethanes obtained using monofunctional hydroxy compounds without unsaturated groups. Although this lowers the viscosity, these nonreactive terminal groups reduce the reactivity on curing with actinic radiation. The desire, however, is for coatings crosslinked thermally using peroxides.

The international patent application WO 99/14254 discloses mixtures of unsaturated resins and crosslinking agents, the crosslinking agents being crystalline polyurethanes containing vinyl, allyl or crotyl ether groups. If desired, it is possible additionally to use crosslinking agents containing (meth)acrylate groups.

The European patent application EP 0 702 040 A1 discloses polyesters whose polymer main chain contains a small number of double bonds incorporated by way of maleic acid or maleic anhydride. The polyesters contain terminal acrylate groups, obtained by the reaction of the hydroxyl end groups of the polyester intermediate with diisocyanates and hydroxyl-containing acrylates. These polyesters, curable with actinic radiation, are, however, of comparatively high molecular mass.

Where the vinyl- and/or acryloyl-containing polyurethanes known from the prior art comprise crystalline, low molecular mass or oligomeric compounds, they have an advantageously low melting point and an advantageously low viscosity. Indeed, their crystallinity gives them blocking resistance as well; however, they have a waxlike/fatty consistency and therefore cannot be extruded and can be ground only with very severe cooling.

Although grindability and extrudability improve as the molecular weight increases, the accompanying increase in melting point and melt viscosity is such that the polyurethanes are no longer suitable as powder coating materials, or as binders for powder coating materials.

The prior art mixtures of low molecular mass, oligomeric or polymeric vinyl ether-functional or acrylate-functional urethanes and unsaturated polyester resins or acryloyl-containing polyacrylates are also unable to solve the problem of the irreconcilability of blocking resistance in the powders and elasticity in the coatings produced from them. The reason for this is probably that the polyurethanes are compatible with the polyesters and the polyacrylates, so that they act like solvents or plasticizers and excessively lower the glass transition temperature of the polyesters and polyacrylates. Increasing the molecular weight, although making it possible to counter this, nevertheless raises the melt viscosity to an undesirable degree and impairs the leveling of the melts.

The problems depicted above also occur identically or similarly with adhesives and sealing compounds, and with the adhesive films and seals produced from them.

It is an object of the present invention to provide novel solids curable with actinic radiation which no longer have the disadvantages of the prior art but instead are blocking resistant as powders and have a low melting point and a low melt viscosity, and following their application to primed and unprimed substrates give elastic coatings, adhesive films and seals having very good mechanical properties.

It was a further object of the present invention to provide a novel process for preparing solids curable with actinic radiation, providing, in a simple manner, blocking-resistant powders of low melting point and low melt viscosity which following their application to primed and unprimed substrates give elastic coatings, adhesive films and seals having very good mechanical properties.

Accordingly, we have found the novel blend, activatable with actinic radiation and solid at room temperature, comprising (A) at least one crystalline compound containing on average per molecule at least one reactive functional group having at least one bond which can be activated with actinic radiation, and (B) at least one amorphous compound containing on average per molecule at least one reactive functional group having at least one bond which can be activated with actinic radiation, which is referred to below as the "blend of the invention".

We have also found the novel process for preparing the blend of the invention with the aid of a multistage process, which involves (I) in a first variant, in at least one first stage, preparing at least one compound (B) and then, in at least one second stage, preparing at least one compound (A) in the compound (B) or in the compounds (B) as reaction medium, or (II) in a second variant, in at least one first stage, preparing at least one compound (A), and then preparing, in at least one second stage, at least one compound (B) in the compound (A) or in the compounds (A) as reaction medium, which is referred to below as the "process of the invention".

The blend of the invention comprises at least one crystalline compound (A). Preferably, the compound (A) is of low molecular mass or oligomeric. It contains on average per molecule at least one, preferably at least two, in particular two, reactive functional group(s) having at least one bond which can be activated with actinic radiation. In the text below, this reactive functional group is referred to for the sake of brevity as a radiation-activatable group. The radiation-activatable groups present in a given compound (A) may be identical to or different from one another. It is preferred to use radiation-activatable groups of the same kind.

A bond which can be activated with actinic radiation means a bond which, on exposure to actinic radiation, becomes reactive and, together with other activated bonds of its kind, undergoes polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, particularly advantageous radiation-activatable groups comprise one double bond or two, three or more double bonds. Where more than one double bond is used, the double bonds may be conjugated. In accordance with the invention, however, it is of advantage if the double bonds are present in isolation, in particular each terminally, in the radiation-activatable group. It is of particular advantage in accordance with the invention to use two, especially one, double bond(s).

Examples of highly suitable radiation-activatable groups are (meth)acrylate, ethacrylate, crotonate, cinnamate, vinyl ether, vinyl ester, dicyclo-pentadienyl, norbornenyl, isoprenyl, isopropenyl, allyl or butenyl groups; dicyclopentadienyl ether, norbornenyl ether, isoprenyl ether, isopropenyl ether, allyl ether or butenyl ether groups; or dicyclopentadienyl ester, norbornenyl ester, isoprenyl ester, isopropenyl ester, allyl ester or butenyl ester groups, especially acrylate groups.

Where the compound (A) contains radiation-activatable groups which are different from one another, the groups in question may comprise, for example, combinations of (meth)acrylate groups and ethacrylate, crotonate, cinnamate, vinyl ether, vinyl ester, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether and/or butenyl ether groups; and/or dicyclopentadienyl ester, norbornenyl ester, isoprenyl ester, isopropenyl ester, allyl ester and/or butenyl ester groups;

cinnamate groups and (meth)acrylate, ethacrylate, crotonate, vinyl ether, vinyl ester, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether and/or butenyl ether groups; and/or dicyclopentadienyl ester, norbornenyl ester, isoprenyl ester, isopropenyl ester, allyl ester and/or butenyl ester groups;

vinyl ether groups and (meth)acrylate, ethacrylate, crotonate, cinnamate, vinyl ester, dicyclopentadienyl, norbornenyl, isoprenyl, isopropenyl, allyl and/or butenyl groups; dicyclopentadienyl ether, norbornenyl ether, isoprenyl ether, isopropenyl ether, allyl ether and/or butenyl ether groups; and/or dicyclopentadienyl ester, norbornenyl ester, isoprenyl ester, isopropenyl ester, ailyl ester and/or butenyl ester groups; or allyl groups and (meth)acrylate, ethacrylate, crotonate, cinnamate, vinyl ether, vinyl ester, dicyclopentadienyl, norbornenyl, isoprenyl, isopropenyl and/or butenyl groups; dicyclopentadienyl ether, norbornenyl ether, isoprenyl ether, isopropenyl ether, allyl ether and/or butenyl ether groups; and/or dicyclopentadienyl ester, norbornenyl ester, isoprenyl ester, isopropenyl ester, allyl ester and/or butenyl ester groups.

Preference in this case is given to the combinations of the (meth)acrylate group, especially the acrylate group, with at least one, especially one, other kind of radiation-activatable group.

Preferably, the radiation-activatable groups are present laterally and/or terminally in the compounds (A). In many cases, terminal radiation-activatable groups are more reactive than lateral groups, owing to the absence of steric shielding, and are therefore to be used with preference. On the other hand, however, the reactivity of the compound (A) may be controlled via the ratio of terminal to lateral groups.

The radiation-activatable groups and also the photoinitiators, photocoinitiators, stabilizing groups, etc. which may be present may be connected to the parent structures of the compounds (A) by way of any desired divalent groups. Preferably, they are attached to the parent structures of the compounds (A) by way of urethane, ester, ether and/or amide groups, especially urethane groups.

If the radiation-activatable groups are attached to the parent structure of the compound (A) by way of urethane groups, the following two linking structures I and II come into consideration:

parent structure -NH—C(O)—O- group     (I) and parent structure -O—(O)C—NH- group     (II).

The compound (A) may contain both linking structures I and II or only one of them. In general, the structure I is of advantage, owing to the larger number of starting products available and their greater ease of preparation, by comparison, and this structure is therefore used with preference in accordance with the invention.

The compound (A) may further comprise chemically attached photoinitiators and/or photocoinitiators, which in particular are linked laterally to the parent structure of the compound (A). Examples of suitable chemically attached photoinitiators are those of the Norrish II type, whose mechanism of action is based on an intramolecular variant of the hydrogen abstraction reactions as occur diversely in photochemical reactions (reference may be made here, by way of example, to Römpp Chemie Lexikon ["Römpp 2"], 9th, expanded and revised edition, Georg Thieme Verlag, Stuttgart, Volume 4, 1991) or cationic photoinitiators (reference may be made here, by way of example, to Römpp 1, pages 444 to 446), especially benzophenones, benzoins or benzoin ethers or phosphine oxides. One example of a suitable photocoinitiator is anthracene. If the chemically attached photoinitiators and/or photoco-initiators are used, they are present in the compound (A) in an amount corresponding on average to from 0.01 to 2.0 attached photoinitiators and/or photocoinitiators per molecule.

The compound (A) may further comprise at least one stabilizer attached chemically to the parent structure. Where used, the compound (A) contains from 0.01 to 1.0 mol %, more preferably from 0.02 to 0.9 mol %, with particular preference from 0.03 to 0.85 mol %, with very particular preference from 0.04 to 0.8 mol %, and in particular from 0.05 to 0.75 mol %, especially from 0.06 to 0.7 mol %, based in each case on the bonds, especially double bonds, of the chemically attached stabilizer that are present in the compound (A) and can be activated with actinic radiation.

The chemically attached stabilizer comprises compounds which are or which donate sterically hindered nitroxyl radicals (>N—O°) which scavenge free radicals in the modified Denisov cycle.

Examples of suitable chemically attached stabilizers are HALS compounds, preferably 2,2,6,6-tetraalkylpiperidine derivatives, especially 2,2,6,6-tetramethylpiperidine derivatives, whose nitrogen atom is substituted by an oxygen atom, an alkyl group, alcoholcarbonyl group or alkyl ether group. For further details, reference is made to the textbook "Lackadditive" [Additives for coatings] by Johan Bieleman, Wiley-VCH, Weinheim, N.Y., 1998, pages 293 to 295.

Furthermore, the compound (A) may include parent-structure-connected groups of the formula III:

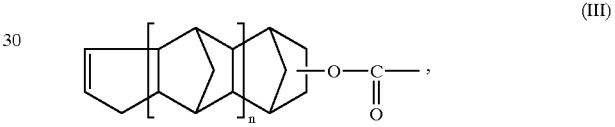

in which the index n denotes an integer from 1 to 10.

Additionally, the parent structure of the compound (A) may include endomethylenetetrahydrophthalic acid structures of the formula IV:

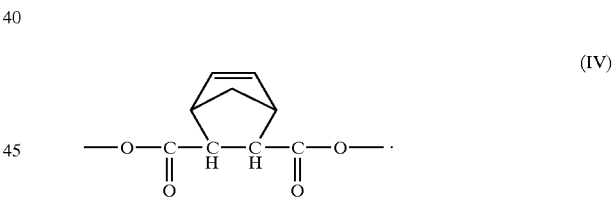

Not least, the compound (A) may carry lateral reactive functional groups which are attached to the parent structure and which are able to undergo free-radically, ionically and/or thermally initiated crosslinking reactions with reactive functional groups of their own kind or with other, complementary, functional groups. In this case, the complementary functional groups may be present in one and the same parent structure, which is the case with what are known as self-crosslinking systems. Alternatively, one kind of the functional groups may be present in a further compound (A) and/or (B) or in a different constituent, for example, a crosslinking agent, which is the case with what are known as externally crosslinking systems. For further details, reference is made to Römpp 1, "Curing", pages 274 to 276. Reactive functional groups of this kind are used in particular when the solid of the invention is to be curable with actinic radiation and thermally (dual cure). They are selected so that they do not disrupt, or even entirely prevent, the actinic-radiation-initiated polymerization or crosslinking reaction of the double bonds of the radiation-activatable groups. However, reactive functional groups for the thermal crosslinking which under addition onto olefinically unsaturated double bonds may be used as well in minor amounts—that is, amounts which are not disruptive.

Examples of suitable complementary reactive functional groups for the thermal crosslinking are evident from the following overview. In the overview, the variable R stands for monovalent organic radicals. The variables R' and R" stand for monovalent organic radicals or are linked cyclically to one another.

| Overview: | Examples of complementary functional groups for the thermal crosslinking |
|---|---|
| —SH<br>—NH$_2$<br>—OH<br>—O—(CO)—NH—(CO)—NH$_2$<br>—O—(CO)—NH$_2$<br>>NH | —C(O)—OH<br>—C(O)—O—C(O)—<br>—NCO<br>—NH—C(O)—OR<br>—CH$_2$—OH<br>—CH$_2$O—R<br>—NH—CH$_2$—O—R<br>—NH—CH$_2$—OH<br>—N(—CH$_2$—O—R)$_2$<br>—NH—C(O)—CH(—C(O)OR)$_2$<br>—NH—C(O)—CH(—C(O)OR)(—C(O)—R)<br>—NH—C(O)—NR'R"<br>>Si(OR)$_2$<br>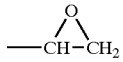 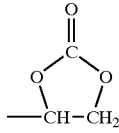 |
| —C(O)—OH | 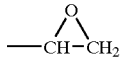<br>—C(O)—N(CH$_2$—CH$_2$—OH)$_2$ |

The parent structure of the compound (A) is of low molecular mass and/or oligomeric. If desired, minor amounts of polymeric structures may also be present. Minor amounts are amounts which advantageously vary the profile of properties of the compound (A) but do not undesirably heighten the melting point or the melt viscosity.

The parent structure of the compound (A) is linear, and for that reason the compound (A) is also linear.

The low molecular mass or oligomeric and, if present, polymeric parent structure includes or consists of linear aromatic, cycloaliphatic and/or aliphatic structures or building blocks. Preferably it includes or consists of cycloaliphatic and/or aliphatic structures, especially aliphatic structures.

Examples of suitable linear aromatic structures are aromatic and heteroaromatic rings having an even number of atoms, especially benzene rings, which are linked with one another directly or indirectly in the para position.

Examples of suitable linear cycloaliphatic structures are rings containing an even number of atoms, preferably cyclobutane, cyclohexane or cyclooctane rings, especially cyclohexane rings, which are linked with one another directly or indirectly in the par aposition.

Examples of aliphatic structures are linear, especially even-numbered, alkyl chains having 2 to 20 carbon atoms, or chains as result from the (co)polymerization of olefinically unsaturated monomers.

The parent structure, especially the oligomeric and also, if present, the polymeric parent structure, may further comprise olefinically unsaturated double bonds.

It is preferred to use aliphatic and/or cycloaliphatic structures, especially aliphatic structures.

The parent structure may include divalent functional groups by means of which the above-described structures or building blocks are linked with one another to form the parent structure. These groups are generally selected so that they do not disrupt, or even completely prevent, the reactions initiated by actinic radiation and also, if desired, initiated thermally. Examples of suitable functional groups are ether, thioether, carboxylate, thiocarboxylate, carbonate, thiocarbonate, phosphate, thiophosphate, phosphonate, thiophosphonate, phosphite, thiophosphite, sulfonate, amide, amine, thioamide, phosphoramide, thiophosphoramide, phosphonamide, thiophosphonamide, sulfonamide, imide, urethane, hydrazide, urea, thiourea, carbonyl, thiocarbonyl, sulfone, sulfoxide or siloxane groups. Of these groups, the ether, carboxylate, carbonate, carboxamide, urea, urethane, imide and carbonate groups, especially the carboxylate groups and the urethane groups, are of advantage and are therefore used with preference.

Advantageous low molecular mass and oligomeric and also, if present, polymeric parent structures are therefore derived from random, alternating, and/or block, linear addition (co)polymers of ethlenically unsaturated monomers, linear polyaddition resins and/or linear polycondensation resins. For further details of these terms, reference is made to Römpp 1, page 457, "Polyaddition" and "Polyaddition resins (polyadducts)", and also pages 463 and 464, "Polycondensates", "Polycondensation" and "Polycondensation resins".

Examples of highly suitable addition (co)polymers are poly(meth)acrylates and partially saponified polyvinyl esters.

Examples of highly suitable polyaddition resins and/or polycondensation resins are polyesters, alkyds, polyurethanes, polyester-polyurethanes, polylactones, polycarbonates, polyethers, polyester-polyethers, epoxy resin-amine adducts, polyureas, polyamides or polyimides. Of these, the polyesters, polyester-polyethers, polyurethanes, including polyether-, polyester- and/or polyether-polyester-polyurethanes, but especially the polyurethanes, are particularly advantageous and are therefore used with very particular preference in accordance with the invention.

The preparation of the linear parent structures for use in accordance with the invention has no special features in terms of its method but instead takes place with the aid of the customary and known synthesis methods of low molecular mass organic chemistry and/or of polymer chemistry. With regard to the oligomeric parent structures which are very particularly preferred in accordance with the invention and derived from polyesters, polyester-polyethers or polyurethanes, but especially polyurethanes, the customary and known methods of polyaddition and/or polycondensation are employed. The starting products used in this case are those which incorporate the above-described groups into the parent structures.

The very particularly preferred low molecular mass and oligomeric urethanes are preferably prepared from
  linear aliphatic and/or cycloaliphatic, especially aliphatic, compounds which contain two isocyanatereactive functional groups, and
  linear diisocyanates.

In this case, the compounds containing the two isocyanate-reactive functional groups, and the diisocyanates, are employed in molar ratios but result in linear low molecular mass and oligomeric urethanes terminated with isocyanate-reactive functional groups or with isocyanate groups, especially with isocyanate groups.

Examples of suitable isocyanate-reactive functional groups are hydroxyl, thiol, primary or secondary amino or imino groups, especially hydroxyl groups.

Examples of suitable compounds containing two isocyanate-reactive functional groups are, accordingly, low molecular mass or oligomeric diols; water, which as is known reacts with two isocyanate groups and, in so doing, gives off carbon dioxide, to give a urea group; diamines; and amino alcohols.

Examples of suitable diamines are ethylenediamine, trimethylenediamine, tetramethylenediamine or hexamethylenediamine.

Examples of suitable amino alcohols are ethanolamine or propanolamine.

Examples of suitable linear diols are low molecular mass diols such as ethylene glycol, 1,4-butylene glycol, 1,6-hexanediol, 1,4-cyclohexanediol, 1,4-cyclohexanedimethanol, dicyclohexanolpropane, diethylene glycol, dipropylene glycol or dibutylene glycol. Examples of suitable oligomeric diols are triethylene glycol, polyethylene glycol, polypropylene glycol, poly(co-ethylene-co-propyleneglycol) or tetrahydrofuran with a number-average molecular weight of more than 500 daltons, especially those having a narrow molecular weight distribution, which are also referred to as polyetherdiols.

Also suitable are diols containing at least one, especially one, of the above-described radiation-activatable groups. They are used to introduce lateral radiation-activatable groups into the low molecular mass and oligomeric urethanes. Examples of suitable diols of this kind are trimethylolpropane monoacrylate or trimethylolpropane monoallyl ether.

The above-described diols, diamines and amino alcohols may be used per se to prepare the polyurethanes. In addition, however, they may be used to prepare the polyesterdiols described below.

Further examples of suitable diols are linear, oligomeric, aliphatic polyesterdiols.

As is known, linear aliphatic polyesterdiols are obtainable by reacting linear aliphatic dicarboxylic acids or the esterifiable derivatives of these carboxylic acids, such as the anhydrides—where they exist or the methyl, ethyl, propyl or butyl esters, with diols.

Examples of suitable linear aliphatic dicarboxylic acids are 1,3-cyclobutanedicarboxylic acid, 1,4-cyclohexanedicarboxylic acid, malonic acid, succinic acid, glutaric acid, adipic acid, pimelic acid, suberic acid, azelaic acid, sebacic acid, undecanedicarboxylic acid or dodecanedicarboxylic acid.

Where the linear polyesterdiol is to include double bonds in its chain, use is made of unsaturated dicarboxylic acids, especially maleic acid and/or fumaric acid, in particular maleic acid. The maleic acid units incorporated in the chains may then be reacted with cyclopentadiene to give the above-described endomethylenetetrahydrophthalic acid units (IV).

Examples of suitable linear aliphatic diols for the preparation of the linear polyesterdiols are the diols described above.

The preparation of the linear aliphatic polyesterdiols has no special features in terms of its method but instead takes place in accordance with the customary and known methods of polyester chemistry, preferably in the presence of small amounts of appropriate solvent as entrainer. Entrainers used are, for example, aromatic hydrocarbons, such as, in particular, xylene, and (cyclo)aliphatic hydrocarbons, e.g., cyclohexane or methylcyclohexane.

Further examples of suitable oligomeric linear aliphatic polyesterdiols are polyesterdiols obtained by reacting a lactone with a diol. They are notable for the presence of terminal hydroxyl groups and repeating polyester fractions of the formula -(—CO—(CHR$^1$)$_m$—CH$_2$—O—)—. In this formula, the index m is preferably from 4 to 6 and the substituent R$^1$=hydrogen or an alkyl, cycloalkyl or alkoxy radical. No one substituent contains more than 12 carbon atoms. The total number of the carbon atoms in the substituent does not exceed 12 per lactone ring. Examples of such compounds are hydroxycaproic acid, hydroxybutyric acid, hydroxydecanoic acid and/or hydroxystearic acid.

For the preparation of the polyesterdiols of this kind, preference is given to the unsubstituted ε-caprolactone, in which m has the value 4 and all R$^1$ substituents are hydrogen. The reaction with lactone is started by low molecular mass polyols such as ethylene glycol, 1,3-propanediol, 1,4-butanediol or dimethylolcyclohexane. It is, however, also possible to react other components, such as ethylenediamine, alkyldialkanolamines or also urea, with caprolactone. Further suitable diols of relatively high molecular mass include polylactam diols, which are prepared by reacting, say, ε-caprolactam with low molecular mass diols.

Examples of highly suitable linear aliphatic polyesterdiols of the kind described above are the polycaprolactonediol sold under the brand name CAPA® of the company Solvay Interox.

Examples of especially suitable linear diisocyanates are tetramethylene 1,4-diisocyanate, hexamethylene 1,6-diisocyanate, octane-1,8-diyl diisocyanate, decane-1,10-diyl diisocyanate, dodecane-1,12-diyl diisocyanate, tetradecane-1,14-diyl diisocyanate, cyclohexane-1,4-diyl diisocyanate or 1,4-bis(isocyanatomethyl) cyclohexane.

Further examples of especially suitable linear diisocyanates are linear oligomeric diisocyanates obtainable by the reaction of at least one of the above-described monomeric diisocyanates with at least one of the above-described compounds containing two isocyanate-reactive functional groups. In this case, the molar ratios are chosen, as is known, so as to give isocyanato-terminated precursors for the compound (A).

The terminal groups which can be activated with actinic radiation are introduced into the low molecular mass and oligomeric urethanes terminated with isocyanate-reactive functional groups by means of compounds which contain an isocyanate group and at least one, especially one, group which can be activated with actinic radiation. This results in the linking structures II. An example of a suitable compound of this kind is 1-(1-isocyanato-1-methylethyl)-3-(1-methylethenyl)benzene, which is sold under the brand name TMI® by the company CYTEC.

The terminal groups which can activated with actinic radiation are introduced into the polyurethanes terminated with isocyanate groups using compounds containing an isocyanate-reactive functional group and at least one, especially one, group which can be activated with actinic radiation. This results in the linking structures I.

Examples of especially suitable compounds of this kind are customary and known monomers which carry one hydroxyl group per molecule, such as allyl alcohol;

hydroxyalkyl esters of acrylic acid or of methacrylic acid, especially of acrylic acid, which are obtainable by esterifying aliphatic diols, for example, the above-described low molecular mass diols (B), with acrylic acid or methacrylic acid or by reacting acrylic acid or methacrylic acid with an alkylene oxide; in particular, hydroxyalkyl esters with acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl,4-hydroxybutyl or bis (hydroxymethyl) cyclohexane acrylate or methacrylate; or reaction products of cyclic esters, such as epsilon-caprolactone, for example, and these hydroxyalkyl or hydroxycycloalkyl esters.

The low molecular mass and oligomeric urethanes are preferably prepared by (1) reacting at least one of the above-described diisocyanates with at least one of the monomers in a ratio of diisocyanate to monomer of 1:1 to give an adduct containing an isocyanate group and an olefinically unsaturated group, and then (2) reacting the adduct with at least one of the above-described compounds containing two isocyanate-reactive groups in a molar ratio of adduct to compound of 2:1 to give the compounds (A) or, respectively, the low molecular mass and oligomeric urethanes (A).

In accordance with another advantageous variant, the low molecular mass and oligomeric urethanes (A) are prepared by (1) reacting at least one of the above-described diisocyanates with at least one of the above-described compounds containing two isocyanate-reactive groups in a molar ratio of 2:1 to give an adduct containing two terminal isocyanate groups, and then (2) reacting the adduct with at least one of the above-described monomers in a molar ratio of 1:2 to give the aliphatic low molecular mass and oligomeric urethanes (A).

The complementary reactive functional groups for thermal crosslinking, stabilizing compounds, photo-coinitiators and/or photoinitiators which may be present if desired, attached to the parent structure, may be introduced comparably into the compounds (A), especially into the low molecular mass and oligomeric urethanes (A).

To introduce lateral groups into the polyurethanes (A), compounds are used in this case that contain two isocyanate-reactive groups and at least one corresponding functional group. Where terminal groups are to be introduced into the low molecular mass and oligomeric urethanes (A), the compounds contain only one isocyanate-reactive group.

Examples of suitable starting products for the introduction of, for example, chemically attached stabilizers are HALS compounds, preferably 2,2,6,6-tetraalkylpiperidine derivatives, especially 2,2,6,6-tetramethylpiperidine derivatives, whose nitrogen atom is substituted by an oxygen atom, an alkyl group, alkylcarbonyl group or alkyl ether group and which contain an isocyanate group or an isocyanate-reactive functional group, in particular a hydroxyl group. An example of an especially suitable starting product is the nitroxyl radical 2,2,6,6-tetramethyl-4-hydroxypiperidine N-oxide.

The example of a suitable starting product for introducing a group of the formula III is the compound III-I

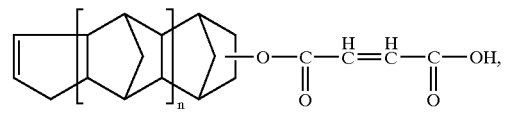

(III-1)

in which the index n is as defined above. Preferably, this compound is introduced into the polyester precursors of the low molecular mass and oligomeric urethanes (A).

Endomethylenetetrahydrophthalic acid structures (IV) may be introduced by reacting maleic anhydride structures, present in the polyester precursors of the low molecular mass and oligomeric urethanes (A), with cyclopentadiene.

Viewed in terms of their method, the processes have no special features, but instead take place in accordance with the customary and known methods of organic isocyanate chemistry. The reactions are preferably conducted under inert gas, using temperatures from 20 to 150, preferably from 30 to 145, more preferably from 40 to 140, and in particular from 50 to 135° C. The reactions may be conducted in an organic solvent or solvent mixture which is not isocyanate-reactive. Examples of suitable organic solvents are ketones or esters such as methyl ethyl ketone, methyl isobutyl ketone, or ethoxyethyl propionate. A further possibility is to conduct the reaction in bulk in the melt. It is further advantageous to use customary and known catalysts such as dibutyl tin dilaurate, lithium decanoate or zinc octoate in effective amounts. The resulting low molecular mass or oligomeric urethane (A) may be isolated and purified by evaporating the solution and/or by crystallization and/or recrystallization. The reactions in the melt have the advantage that the low molecular mass or oligomeric urethane (A) is obtained in solvent-free form.

The blend of the invention comprises at least one compound (B) which is crystalline in the customary and known sense. Preferably, the compound (B) is of low molecular mass or oligomeric. It contains on average per molecule at least one, preferably at least two, in particular two, radiation-activatable groups. The radiation-activatable groups present in a given compound (B) may be identical to or different from one another. Preferably, radiation-activatable groups of the same kind are used.

As regards the terminal and/or lateral radiation-activatable groups, the chemically attached photoinitiators and photocoinitators, the chemically attached stabilizing compounds the groups of the formulae III and IV, the reactive functional groups for thermal crosslinking, the linking structures I and II, and the starting products for the preparation of the parent structures of the compounds (B), and also the preparation processes for the compounds (B), the comments made above with regard to the compounds (A) apply here analogously.

In contradistinction to the compounds (A), however, the compounds (B) are preferably nonlinear in construction. The compounds (B) may be branched or unbranched. Preferably, the compounds (B) contain little or no branching, so as to avoid high melt viscosities.

The nonlinearity of the compounds (B), especially of the low molecular mass and oligomeric urethanes (B), is achieved by the use at least one nonlinear and/or one polyfunctional starting product during the preparation of the compounds (B). Examples of suitable starting products are nonlinear diisocyanates and nonlinear diols, diamines or amino alcohols, polyols, polyamines, polyfunctional amino alcohols or polyisocyanates, which may be used in addition to or instead of the starting products described above in connection with the compound (A).

Examples of suitable nonlinear diisocyanates are isophorone diisocyanate (i.e., 5-isocyanato-1-isocyanatomethyl-1, 3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop1-yl)cyclohexane, 1-isocyanato-2-(3-isocyanatoeth-1yl)cyclohexane, 1-isocyanato-2-(4-isocyanatobut-1-yl)cyclohexane, 1,2-diisocyanatocyclobutane, 1,2-diisocyanatocyclopentane, 1,3-diisocyanatocyclopentane, 1,2-diisocyanatocyclohexane, 1,3-diisocyanatocyclohexane, diisocyanates derived from dimeric fatty acids, as sold under the commercial designation DDI 1410 by the company Henkel and described in the patents WO 97/49745 and WO 97/49747, especially 2-heptyl-3,4-bis(9-isocyanatononyl)-1pentylcyclohexane, or 1,2-, 1,4- or 1,3-bis(isocyanatomethyl)cyclohexane, 1,2- or 1,3-bis(2-isocyanatoeth-1-yl)cyclohexane, 1,3-bis(3-isocyanatoprop-1-yl)cyclohexane, 1,2- or 1,3-bis(4-isocyanatobut-1-yl)cyclohexane, liquid bis(4-isocyanatocyclohexyl) methane with a trans/trans content of up to 30% by weight, preferably 25% by weight, and especially 20% by weight, as described by the patents DE-A-44 14 032, GB-A-1220717, DE-A-16 18 795 or DE-A-17 93 785; tolylene diisocyanate, xylylene diisocyanate, bisphenylene diisocyanate or naphthylene diisocyanate, but especially isophorone diisocyanate.

Examples of suitable polyisocyanates are the isocyanurates of the above-described diisocyanates. Further examples of suitable polyisocyanates are polyurethane preopolymers containing isocyanate groups, preparable by reacting polyols with an excess of polyisocyanates and preferably beingof low viscosity. It is also possible to use polyisocyanates containing biuret, allophanate, iminooxadiazinedione, urethane, urea, carbodiimide and/or uretdione groups. Polyisocyanates containing urethane groups, for example, are obtained by reacting some of the isocyanate groups with polyols, such as trimethylolpropane and glycerol, for example.

Examples of suitable branched diols and polyols are 1,2-propanediol, 1,2- or 1,3-butanediol, 1,2-, 1,3- or 1,4-pentanediol, 1,2-, 1,3-, 1,4- or 1,5-hexanediol, neopentyl glycol, 1,2- or 1,3-cyclohexanediol, 1,2- or 1,3-cyclohexanedimethanol, the positionally isomeric diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-ditert-butyl-1,3-propanediol, 2-butyl-2-propyl-1,3-propanediol, 1-dihydroxymethyl-bicyclo [2.2.1]heptane, 2,2-diethyl-1,3-propanediol, 2,2-dipropyl-1, 3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol or 1,3-(2'-hydroxypropyl)benzene.

Examples of suitable triols are trimethylolethane, trimethylolpropane or glycerol, especially trimethylolpropane.

Examples of suitable tetrols are pentaerythritol or homopentaerythritol.

Examples of suitable polyols of relatively high functionality are sugar alcohols such as threitol, erythritol, arabitol, adonitol, xylitol, sorbitol, mannitol or dulcitol.

Examples of suitable nonlinear and/or polyfunctional amines and amino alcohols are isophoronediamine, 4,2'-diaminodicyclohexylmethane, 1-amino-3-aminomethyl-3,5, 5-trimethylcyclohexane, diethylenetriamine, triethylenetetramine, dipropylediamine, dibutylenetriamine, diethanolamine or triethanolamine.

These starting products may also be used per se to prepare the low molecular mass and oligomeric urethanes (B) or their precursors, the polyesters.

For the preparation of the polyesters as precursors for the low molecular mass and oligomeric urethanes (B) it is possible as nonlinear and/or polyfunctional carboxylic acids to use phthalic acid, isophthalic acid, phthalic or isophthalic monosulfate, halophthalic acids, such as tetrachloro- and/or tetrabromophthalic acid, itaconic acid, 1,2-cyclobutanedicarboxylic acid, 1,2-cyclopentanedicarboxylic acid, 1,3-cyclopentanedicarboxylic acid, hexahydrophthalic acid, 1,3-cyclohexanedicarboxylic acid, 4-methylhexahydrophthalic acid, tricyclodecanedicarboxylic acid, tetrahydrophthalic acid, endomethylenetetrahydrophthalic acid, 4-methyltetrahydrophthalic acid, trimellitic acid, symbenzenetricarboxylic acid, 1,2,4-cyclohexanetricarboxylic acid, 1,2,4,5-cyclohexanetetracarboxylic acid, or polymeric fatty acids, especially those having a dimer content of more than 90% by weight, which are also known as dimeric fatty acids, such as their esters and anhydrides (where they exist).

The blend of the invention comprises at least one of the above-described compounds (A) and at least one of the above-described compounds (B), or consists thereof.

Accordingly, the blend of the invention may contain up to 100% by weight of the compounds (A) and (B). Preferably, the blend of the invention contains at least 50, more preferably at least 60, with particular preference at least 70, with very particular preference at least 80, and in particular at least 90% by weight of the compounds (A) and (B).

Preferably, the phase diagram of the blend of the invention has a miscibility gap in the region of the solid state, i.e., below the melting temperatures of the compounds (A) and (B). This means that the compounds (A) and (B) are not miscible with one another in the solid state but instead form finely particulate domains containing either solely or predominantly the compounds (A) or solely or predominantly the compounds (B).

Preferably, however, the compounds (A) and (B) are miscible with one another in the melted state, preferably in any proportion.

The weight ratio of compounds (A) to compounds (B) in the blend of the invention may vary very widely. It is guided in particular by the respective amounts of compounds (A) and (B) required to ensure a very low melting point, a very low melt viscosity, high blocking resistance, and effective grindability. The ratio (A):(B) is preferably from 1:10 to 5:1, more preferably from 1:9 to 4:1, with particular preference from 1:8 to 3:1, with very particular preference from 1:7 to 2:1, and in particular from 1:6 to 1:1.

The blend of the invention preferably has a melting point or a very narrow melting range of from 40 to 130, more preferably from 45 to 110, with particular preference from 50 to 100, with very particular preference from 55 to 90, and in particular from 60 to 80° C. The melting range preferably extends over not more than 30, more preferably 25, with particular preference 20, with very particular preference 15, and in particular 10° C.

The blend of the invention at 140° C. preferably has a melt viscosity of from 500 to 8000, more preferably from 1000 to 6000, with very particular preference from 1100 to 5000, and in particular from 1200 to 4000 mPas.

The blend of the invention may be prepared by all customary and known methods of preparing mixtures of plastics. For example, the compounds (A) and (B) may each be prepared separately, after which they are shaped as melts in customary and known mixing equipment, such as static mixers, extruders or compounders, to give the blends of the invention. Alternatively, the compounds (A) and (B) may be mixed with one another in solution, after which the solvents are removed by distillation.

Preferably, the blends of the invention are prepared by the multistage process of the invention. The multistage process may be implemented in a plurality of variants. The key feature is that, first of all, at least one compound (A) or (B) is prepared, after which at least one compound (B) or (A) is prepared in the compound or compounds (A) or (B).

In a first preferred variant of the process of the invention, in at least one first stage, at least one compound (B) is prepared, after which, in at least one second stage, at least one compound (A) is prepared in the compound (B) or in the compounds (B) as reaction medium.

In a second preferred variant, in at least one first stage, at least one compound (A) is prepared, after which, in at least one second stage, at least one compound (B) is prepared in the compound (A) or in the compounds (A) as reaction medium.

In the case of the two preferred variants, it is additionally possible to prepare, in at least one further stage, at least one compound (A) and/or at least one compound (B) in the product mixtures of the preceding stages.

The process of the invention offers numerous different possibilities for preparing the blends of the invention. As a result, it may be adapted very effectively to specific requirements, thereby producing numerous new kinds of possibilities for controlling the process and the profile of properties of the blends of the invention. A further key advantage of the process of the invention is that it may be implemented in the melt in the absence of solvents. The resulting melts, after they have solidified, give the blends of the invention directly. A further key advantage of the process of the invention is that the melts may be admixed with additives as commonly used in coating materials, adhesives, and sealing compounds. Owing to the low viscosity of the melts, the additives may be dispersed to particular effect.

The blends of the invention are outstandingly suitable for preparing coating materials, adhesives or sealing compounds which are curable with actinic radiation, or thermally and with actinic radiation. For this purpose, they are converted into the form suitable for the respective intended use by means of physical processing such as grinding, followed if appropriate by sieving or classifying, and/or by the addition of appropriate additives.

The resulting coating materials, adhesives or sealing compounds of the invention are preferably powders or granules, or powders dispersed in water and/or in organic solvents (powder slurries). Preferably, the adhesives and sealing compounds are powders, granules, or powders dispersed in water and/or in organic solvents, and the coating materials are powders, or powders dispersed in water and/or in organic solvents.

In this form, the coating materials, adhesives, and sealing compounds of the invention are outstandingly suitable for coating, bonding or sealing primed and unprimed substrates of any kind, but especially motor vehicles, including commercial vehicles and automobiles, and parts thereof, buildings, interior and exterior, furniture, doors and windows, articles of private or industrial use, including coils, containers, and electrical components.

With very particular preference, the blend of the invention is used as a powder coating material. The particle size distribution of the powder coating materials of the invention may vary widely and is guided by the particular use for which it is intended. The average particle size is preferably from 1 to 200 μm, more preferably from 2 to 150 μm, and with particular preference from 3 to 100 μm. By average particle size is meant the 50% median value as determined by the laser diffraction method, i.e., 50% of the particles have a diameter≦the median value and 50% of the particles have a particle diameter≧the median value.

Examples of suitable additives typical for powder coatings are crosslinking agents which comprise the above-described complementation reactive functional groups, color and/or effect pigments, fluorescent pigments, electrically conductive pigments and/or magnetically shielding pigments, metal powders, soluble organic dyes, organic and inorganic, transparent or opaque fillers, UV absorbers, light stabilizers, free-radical scavengers, devolatilizers, slip additives, polymerization inhibitors, crosslinking catalysts, thermally labilefree-radical initiators, photo-initiators and photocoinitators, heat-curable reactive diluents, reactive diluents curable with actinic radiation, adhesion promoters, leveling agents, film forming auxiliaries, flame retardants, corrosion inhibitors, free-flow aids, waxes and/or flatting agents. The constituents may be employed individually or as mixtures. Examples of suitable additives are described in detail in the textbook "Lackadditive" [Additives for coatings] by Johan Bieleman, Wiley-VCH, Weinheim, N.Y., 1998.

Of particular significance are the color and/or effect, fluorescent, electrically conductive and/or magnetically shielding pigments and the fillers.

Examples of suitable effect pigments are metal flake pigments such as commercial aluminum bronzes, aluminum bronzes chromated in accordance with DE 36 36 183 A1, and commercial stainless steel bronzes, and also nonmetallic effect pigments, such as pearlescent pigments and interference pigments, for example, platelet-shaped effect pigments based on iron oxide having a shade from pink to brownish red, or liquid-crystalline effect pigments. For further details, reference is made to Römpp 1, page 176, "Effect pigments" and pages 380 and 381, "Metal oxide-mica pigments" to "Metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat No. 4,828,826 A and U.S. Pat No. 5,244,649 A.

Examples of suitable inorganic color pigments are white pigments such as titanium dioxide, zinc white, zinc sulfide or lithopone; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyaninine pigments or aniline black.

For further details, reference is made to Römpp 1, pages 180 and 181, "Iron blue pigments" to "Black iron oxide", pages 451 to 453, "Pigments" to "Pigment volume concentration", page 563, "Thioindigo pigments", page 567, "Titanium dioxide pigments", pages 400 and 467, "Naturally occurring pigments", page 459, "Polycyclic pigments", page 52, "Azomethine pigments", "Azo pigments", and page 379, "Metal complex pigments".

Examples of fluorescent pigments (daylight fluorescent pigments) are bis(azomethine)pigments.

Examples of suitable electrically conductive pigments are titanium dioxide/tin oxide pigments.

Examples of magnetically shielding pigments are pigments on the basis of iron oxides or chromium dioxide.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, reference is made to Römpp 1, pages 250 ff., "Fillers".

It is preferred to employ mica and talc if the intention is to enhance the scratch resistance of the coatings produced from the powder coating materials of the invention.

It is further advantageous to use mixtures of platelet-shaped inorganic fillers such as talc or mica and non-platelet-shaped inorganic fillers such as chalk, dolomite, calcium sulfates, or barium sulfate, since this makes it possible to adjust the viscosity and the rheology to very good effect.

Examples of suitable transparent fillers are those based on silicon dioxide, aluminum oxide or zirconium oxide, but especially nanoparticles on this basis.

Preferably, the additives described above are added to the melts of the blends of the invention, provided that within the temperature range employed they do not undergo decomposition or unwanted reactions with the other constituents of the powder coating materials of the invention.

The application of the powder coating material of the invention has no special features in terms of its method but instead takes place with the aid of customary and known techniques and equipment, for example, by means of electrostatic spraying, here again using conditions under which no premature thermal crosslinking and/or crosslinking with actinic radiation and/or other damage to individual constituents of the powder coating material of the invention as a result, for example, of thermal degradation occur (cf. also the BASF Coatings AG company brochures "Pulverlacke, Pulverlacke für industrielle Anwendungen" [Powder coating materials, powder coatings for industrial applications], January 2000, and "Coatings Partner, Pulverlack Spezial" [Powder coatings special], 1/2000).

The powder coating material of the invention may be applied in a very wide variety of thicknesses, resulting in coatings of a wide variety of thicknesses, in particular from 10 to 250 $\mu$m. The thickness of the coatings is guided by their intended use and may therefore be adjusted as a matter of course by the skilled worker.

The curing of the applied powder coating films likewise has no special features in terms of its method but is carried out using the customary and known techniques and equipment.

Accordingly, the powder coating layers may be melted by the customary and known methods such as heating in a forced-air oven or irradiation with IR lamps.

Curing with actinic radiation may be conducted with electromagnetic radiation such as X-rays, UV radiation, visible light or near infrared (NIR) light, especially UV radiation, or with corpuscular radiation such as electron beams. Techniques and equipment for the curing with actinic radiation are customary and known and are described, for example, in R. Holmes, "U.V. and E.B. Curing Formulations for Printing Inks, Coatings and Paints", SITA Technology, Academic Press, London, United Kingdom 1984.

The thermal curing likewise has no special features in terms of its method but instead takes place in accordance with the customary and known methods such as heating in a forced air oven or irradiation with IR lamps.

Suitable coating substrates are all surfaces of articles which are amenable to curing of the coating films present thereon using heat and actinic radiation, examples being articles of metals, plastics, wood, ceramic, stone, textile, fiber composites, leather, glass, glass fibers, glass wool, rock wool, or mineral- and resin-bound building materials, such as plasterboard and cement slabs or roof tiles.

The metallic substrates employed in this case may have a primer, in particular an electrodeposition coating deposited cathodically or anodically and cured by means of heat. If desired, the electrodeposition coat may also have been coated with an antistonechip primer or with a surfacer.

The resulting coatings have outstanding mechanical properties, excellent leveling, and adhere very well to metallic substrates.

The above remarks apply mutatis mutandis to the powder slurries prepared from the powder coating materials of the invention, as well. Specifically because of the very good grindability of the powder coating materials, the powder slurries obtained are particularly advantageous.

Particular advantages result if the adhesive films, seals and coatings of the invention are produced with the aid of the application and curing process of the invention.

For this purpose, (1) at least one coating material and/or adhesive and/or sealing compound of the invention is applied in the form
    (1.1) of a melt,
    (1.2) of a powder, or
    (1.3) of a powder slurry to the above-described primed or unprimed substrate, (2) the resulting powder slurry film (1.3) is dried or the resulting film of the melt (1.1) is left to solidify or is maintained in the melted state by heating, (3) the resulting solid film (1.2) or (1.3) is melted by heating, and (4) the melted layer resulting from step (2) or (3),
    (4.1) in the melted state,
    (4.2) on solidification, and/or
    (4.3) after solidification is cured with actinic radiation.

Given an appropriate composition of the coating materials, sealing compounds and adhesives, thermal curing may be carried out in addition to the curing with actinic radiation, before, during or after step (4) of the process.

The adhesive films and seals produced from the adhesives and sealing compounds of the invention have an outstanding bond strength and sealing capacity even over long periods of time and even under extreme climatic conditions.

In addition to the advantages described above, the coatings of the invention also possess particularly high weathering stability and yellowing resistance.

EXAMPLES AND COMPARATIVE EXPERIMENTS

Preparation Example 1

The Preparation of an Adduct of Dicyclopentadiene and Maleic Anhydride 661.10 g of dicylopentadiene (5.0 mol) and 490.30 g of maleic anhydride (5.0 mol) were weighed out into a stirred flask having heating in a reflux condenser. The reaction mixture was heated to 125° C. under a gentle stream of nitrogen, after which 95.00 g of water (5.0 mol+5 g) were added over the course of one hour from a dropping funnel. Reaction was continued at 125° C. for one hour, giving the monocarboxylic acid

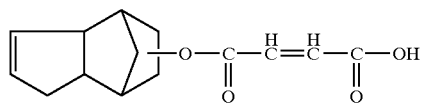

Preparation Example 2

The Preparation of a Hydroxyl-terminated Unsaturated Polyester 220.5 g of maleic anhydride (2.25 mol), 64.6 g of the monocarboxylic acid of Preparation Example 1 (0.25 mol), 279 g of ethylene glycol (4.5 mol), 5.65 g of 50% strength hypophosphorous acid and 0.05 g of hydroquinone were weighed out into a reaction vessel having a distillation bridge mounted on it and were heated slowly with stirring to 150° C., during which the water of reaction formed was removed by distillation. Subsequently, condensation was carried out at 150° C. for two hours, at 170° C. for one hour, at 180° C. for two hours, and at 190° C. for five hours. The resulting polyester had an acid number of 3 mg KOH/g and a hydroxyl equivalent weight of 259.55 g.

Comparative Experiment C1

The Preparation of the Crystalline Oligourethane C1

A crystalline oligourethane with the following structural scheme:

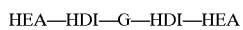

was prepared. For its preparation, 93 g of ethylene glycol (G) (1.5 mol), 348 g of hydroxyethyl acrylate (HEA) (3 mol) and 0.48 g of 2,2,6,6-tetramethyl-4-hydroxypiperidine N-oxide were charged under nitrogen to a reaction vessel and heated to 60° C. 504 g of hexamethylene diisocyanate (HDI) (3 mol) and 0.96 g of dibutyltin dilaurate were metered into this initial charge over the course of one hour. Following the initial exothermic reaction, the reaction mixture was held at from 130 to 140° C. After the end of the addition, reaction was continued at 150° C. for 10 minutes. The resulting melt was clear. It was poured on to aluminum foil, and solidified on cooling.

The oligourethane C1 was cloudy at room temperature and of waxlike, slightly greasy consistency. It could not be ground in customary powder coating mills, and was insoluble in numerous customary organic solvents for coatings. Its melting point was 125° C., the melt viscosity at 800 mPas was 150° C. However, this melt viscosity was too low for processing in a powder coating extruder.

Comparative Experiment C2

The Preparation of the Crystalline Oligourethane C2

A crystalline oligourethane with the following structural scheme:

was prepared. For this purpose, 354 g of 1,6-hexanediol (HX) (2 mol), 232 g of hydroxyethyl acrylate (HEA) (2 mol) and 0.5 g of 2,2,6,6-tetramethyl-4-hydroxypiperidine N-oxide were charged under nitrogen to a reaction vessel and heated to 60° C. 504 g of hexamethylene diisocyanate (HDI) (3 mol) and 1.0 g of dibutyltin dilaurate were metered into this initial charge over the course of one hour. Following the initial exothermic reaction, the reaction mixture was held at from 130 to 140° C. After the end of the addition, reaction was continued at 150° C. for 10 minutes. The resulting melt was clear. It was poured onto aluminum foil, and solidified on cooling.

The oligourethane C2 was cloudy at room temperature and of waxlike, slightly greasy consistency. It could not be ground in customary powder coating mills, and was insoluble in numerous customary organic solvents for coatings. Its melting point was 140° C., the melt viscosity at 2850 mPas was 150° C. The melting point was too high for the majority of powder coating applications. In the course of processing in a powder coating extruder, gel particles were formed.

Comparative Experiment C3

The Preparation of the Crystalline Oligourethane C3

An oligourethane of the following structural scheme:

HEA—HDI—HX—HDI—HX—HDI—HX—HDI—HEA was prepared.

For this purpose, 531 g of 1,6-hexanediol (HX) (3 mol), 232 g of hydroxyethyl acrylate (HEA) (2 mol) and 0.8 g of 2,2,6,6-tetramethyl-4-hydroxypiperidine N-oxide were charged under nitrogen to a reaction vessel and heated to 60° C. 1008 g of hexamethylene diisocyanate (HDI) (6 mol) and 1.5 g of dibutyltin dilaurate were metered into this initial charge over the course of one hour. Following the initial exothermic reaction, the reaction mixture was held at from 160 to 165° C. After the end of the addition, reaction was continued at 165° C. for 10 minutes. The resulting melt was clear. It was poured onto aluminum foil, and solidified on cooling.

The resulting oligourethane C3 was a cloudy, resinous substance of waxlike, slightly greasy consistency. It could not be ground in customary powder coating mills, and was insoluble in numerous customary organic solvents for coatings. Its melting point was 155° C., the melt viscosity at 5400 mPas was 160° C. The melt, however, was not stable but began to crosslink at this temperature.

Comparative Experiment C4

The Preparation of the Amorphous Oligourethane C4

An oligourethane of the following structural scheme:

HEA—IPDI—G—IPDI—G—IPDI—HEA was prepared.

For this purpose, 124 g of ethylene glycol (G) (2 mol), 232 g of hydroxyethyl acrylate (HEA) (2 mol) and 0.8 g of 2,2,6,6-tetramethyl-4-hydroxypiperidine N-oxide were charged under nitrogen initially and heated to 60° C. 666 g of isophorone diisocyanate (IPDI) (3 mol) and 1.0 g of dibutyltin dilaurate were metered into this initial charge over the course of one hour. Following the initial exothermic reaction, the reaction mixture was held at from 100 to 120° C. After the end of the addition, reaction was continued at 125° C. for 30 minutes. The resulting melt was clear. It was poured onto aluminum foil, and solidified on cooling.

The resulting oligourethane C4 was a clear hard resin at room temperature. It was resistant to blocking and, at room temperature, was readily grindable using customary powder coating mills, and was soluble in the organic solvents customary for coatings. Its melting point was 75° C., its melt viscosity at 7600 mPas was 140° C. The melt viscosity was just still acceptable for practical application.

Example 1

The preparation of the Inventive Blend 1

An inventive blend having the structural scheme:

| About 60% by weight | HEA-IPDI-G-IPDI-G-IPDI-HEA 1st amorphous stage |
| About 20% by weight | HEA-IPDT-G-IPDI-DCHP-IPDI-HEA 2nd amorphous stage |
| About 20% by weight | HEA-HDI-HX-HDI-HEA crystalline stage | was prepared.

For this purpose, 82.66 g of ethylene glycol (G) (1.333 mol), 154.66 g of hydroxyethyl acrylate (HEA) (1.333 mol) and 0.33 g of 2,2,6,6-tetramethyl-4-hydroxypiperidine N-oxide were charged under nitrogen to a reaction vessel and heated to 60° C. 444 g of isophorone isocyanate (IPDI) (2 mol) and 0.66 g of dibutyltin dilaurate were metered in over the course of 30 minutes. Following the initial exothermic reaction, the reaction mixture was held at from 90 to 120° C. After the end of the addition, reaction was continued at 125° C. for a further 10 minutes.

11.74 g of ethylene glycol (0.189 mol), 43.9 g of hydroxyethyl acrylate (0.378 mol), 45.4 g of dicyclohexanolpropane (DCHP) (0.189 mol) and 0.2 g of 2,2,6,6-tetramethyl-4-hydroxypiperidine N-oxide were metered in to the reaction mixture formed in the first stage. Following the addition the mixture was again heated to 125° C., after which 126 g of isophorone diisocyanate (0.568 mol) and 0.4 g of dibutyltin dilaurate were metered in at from 120 to 130° C. over the course of 15 minutes. The resulting reaction mixture was stirred at 125° C. for 10 minutes.

42.48 g of 1,6-hexanediol (0.36 mol), 83.6 g of hydroxyethyl acrylate (0.721 mol) and 0.2 g of 2,2,6,6-tetramethyl-4-hydroxypiperidine N-oxide were added at 125° C. to this reaction mixture formed in the second stage. Subsequently, 121.1 g of hexamethylene diisocyanate (HDI) (0.721 mol) and 0.4 g of dibutyltin dilaurate were metered in over the course of 15 minutes at 125° C. The resulting reaction mixture was left to react at 125° C. for 10 minutes more. The melt was clear. It was poured onto aluminum foil, and solidified on cooling.

The resulting inventive blend 1 was a cloudy, hard resin. It was readily grindable at room temperature using customary powder coating mills, and was soluble as a cloudy dispersion in the organic solvents customary for coating. Its melting point was approximately 70° C., its melt viscosity at 2700 mPas was 140° C. The melt viscosity was optimal. The blend 1 was outstandingly suitable for preparing powder coating materials.

Example 2

The Preparation of the Inventive Blend 2

An inventive blend having the structural scheme:

| | |
|---|---|
| 70% by weight | HEA-IPDI-[-(0.8 G/0.2 HOE)-]-IPDI-[-(-0.8 G/0.2 HOE)-]-IPDI-HEA amorphous stage |
| 20% by weight | HEA-HDI-G-HDI-G-HDI-G-HDI-HEA 1st crystalline stage |
| 10% by weight | HEA-HDI-HX-HDI-HX-HDI-HEA 2nd crystalline stage | was prepared.

For this purpose, 74.4 g of ethylene glycol (G), 174 g of hydroxyethyl acrylate (HEA), 155.7 g of the polyester from Preparation Example 2 (HOE), 0.45 g of 2,2,6,6-tetramethyl-4-hydroxypiperidine N-oxide, 0.45 g of hydroquinone monomethyl ether and 0.22 g of tertbutylcresol were charged under nitrogen to a reaction vessel and heated to 60° C. Subsequently, 499.5 g of isophorone diisocyanate (IPDI) and 0.9 g of dibutyltin dilaurate were metered in over the course of 30 minutes. During the addition, the temperature of the reaction mixture was held by cooling at from 80 to 120° C. Subsequently, stirring was continued at from 120 to 130° C. for five minutes.

44.0 g of ethylene glycol, 55 g of hydroxyethyl acrylate, and 0.12 g of 2,2,6,6-tetramethyl-4-hydroxypiperidine N-oxide were dissolved at 100° C. into the reaction mixture formed in the first stage. 159.1 g of hexamethylene diisocyanate (HDI) and 0.25 g of dibutyltin dilaurate were metered in to the resulting mixture at from 120 to 130° C. over the course of 15 minutes. The resulting reaction mixture was left to react at 125 to 130° C. for 15 minutes.

31.3 g of 1,6-hexanediol (HX), 30.8 g of hydroxyethyl acrylate and 0.1 g of 2,2,6,6-tetramethyl-4-hydroxypiperidine N-oxide were dissolved at this temperature to the reaction mixture formed in the second stage. Subsequently, 66.9 g of hexamethylene diisocyanate and 0.12 g of dibutyltin dilaurate were metered in over the course of 15 minutes at 125° C. The reaction mixture was left to react at 125 to 130° C. for 10 minutes more. The resulting melt was clear. It was poured onto aluminum foil, and solidified on cooling.

The inventive blend 2 was a cloudy, hard resin at room temperature. It was blocking resistant at room temperature and readily grindable at room temperature using customary powder coating mills, and was soluble as a cloudy dispersion in the organic solvents customary for coating. Its melting point was approximately 75° C. its melt viscosity at 3900 mPas was 140° C. The inventive blend 2 was very suitable for processing on an extruder and was outstandingly suitable for the preparation of powder coating materials.

Examples 3 and 4 and Comparative Experiments C5 to C8

The Preparation of Inventive Powder Coating Materials and Coatings (Examples 3 and 4) and of Noninventive Powder Coating Materials and Coatings (Comparative Experiments C5 to C8)

For Example 3, the inventive blend 1 of Example 1 was used.

For Example 4, the inventive blend 2 of Example 2 was used.

For Comparative Experiment C5, the oligourethane C1 of Comparative Experiment C1 was used.

For Comparative Experiment C6, the oligourethane C2 of Comparative Experiment C2 was used.

For Comparative Experiment C7, the oligourethane C3 of Comparative Experiment C3 was used.

For Comparative Experiment C8, the oligourethane C4 of Comparative Experiment C4 was used.

For the preparation of the powder coating materials, 30 g of each of the oligourethanes C1 to C4 and each of the inventive blends 1 and 2 together, based on the powder coating material, with 2% by weight of Lucirin® TPO (commercial photoinitiator from BASF Aktiengesellschaft) and 1.0% by weight of benzoin (devolatilizing assistant) were mixed in the melt and homogenized. The solidified melts were coarsely comminuted and introduced into box-type coating bars with a gap height of 80 $\mu$m, which were placed on steel test panels. The test panels were then placed, together with the coating bars, on a hot plate at 150° C. After about 15 minutes, the powder coating materials were liquid, and films were drawn down onto the test panels. The resulting liquid films were immediately exposed to a UV radiation dose of 1900 mJ/cm$^2$ at a rate of advance of 10 m/minute in the absence of air. The resulting coatings were approximately 50 $\mu$m thick. Their solvent resistance, hardness, substrate adhesion, and elasticity were tested. The results of the tests can be found in the table.

TABLE

Performance properties of the inventiv coatings of Examples 3 and 4 and of the noninventive coatings of Comparative Experiments C5 to C8

| Examples/ Comparative Experiments | Erichsen value[a] | Cross-cut[b] | Pendulum hardness[c] | MEK[d] |
|---|---|---|---|---|
| 3 | 6.5 | 1 | 184 | 50 |
| 4 | >9 | 0 | 192 | >100 |
| C5 | >9 | 3 | 142 | 20 |
| C6 | >9 | 3 | 154 | 20 |
| C7 | >9 | 3 | 159 | 20 |
| C8 | 0.5 | 5 | 187 | 20 |

[a]Erichsen indentation in accordance with DIN EN ISO 1520:1995-04;
[b]Cross-cut test in accordance with DIN ISO 2409:1994-10;
[c]Pendulum attenuation test in accordance with DIN 53157:1987-01;
[d]Double strokes performed with a cotton pad soaked with methyl ethyl ketone until the coating was damaged.

The coating C5, although of very good elasticity and of acceptable adhesion, had a hardness which was too low, as was the solvent resistance.

The coating C6 likewise had very good elasticity. Adhesion and hardness, however, were at too low a level for numerous applications. The solvent resistance also left something to be desired.

The coating C7 had a very good elasticity, the adhesion was acceptable, but the hardness and solvent resistance were too low.

Owing to the difficulty of grinding the crystalline urethanes C1 to C3 in question, the powder coating materials of Comparative Experiments C5 to C7 could not be produced with the aid of the typical powder coating techniques and equipment.

The coating C8 was brittle and of poor adhesion.

The coating of Example 3 exhibited good elasticity, adhesion, and hardness. The solvent resistance was markedly better than in the case of the comparative experiments.

The coating of Example 4 exhibited very good solvent resistance, elasticity, adhesion, and hardness.

What is claimed is:

1. A process for preparing a blend with the aid of a multistage process, comprising one of
   (I) in a first variant, in at least one first stage, preparing at least one compound (B) and then, in at least one second stage, preparing at least one compound (A) in the at least one compound (B) as reaction medium, or
   (II) in a second variant, in at least one first stage, preparing at least one compound (A), and then preparing, in at least one second stage, at least one compound (B) in the at least one compound (A) as reaction medium, wherein the blend is activatable with actinic radiation and is solid at room temperature and comprises
   (A) at least one crystalline compound containing on average per molecule at least one reactive functional group having at least one bond which can be activated with actinic radiation, and
   (B) at least one amorphous compound containing on average per molecule at least one reactive functional group having at least one bond which can be activated with actinic radiation.

2. The process of claim 1, wherein with variants (I) and (II) in at least one further stage at least one of the at least one compound (A) and the at least one compound (B) is prepared in a product mixture of a preceding stage.

* * * * *